United States Patent [19]

Koljonen

[11] 4,041,302

[45] Aug. 9, 1977

[54] DUAL COLOR TAILLAMP

[75] Inventor: Vilho Koljonen, Warren, Mich.

[73] Assignee: General Motors Corporation, Detroit, Mich.

[21] Appl. No.: 702,672

[22] Filed: July 6, 1976

[51] Int. Cl.² .......................... B60Q 1/30; B60Q 1/34; B60Q 1/44
[52] U.S. Cl. ..................... 240/8.3; 240/8.2; 240/46.59
[58] Field of Search ........................ 240/8.3, 8.2, 8.22, 240/46.59, 46.01, 41.3, 1.1; 340/87, 89

[56] References Cited

U.S. PATENT DOCUMENTS

| | | | |
|---|---|---|---|
| 3,267,279 | 8/1966 | Doolittle | 240/8.3 X |
| 3,487,206 | 12/1969 | Dawson et al. | 240/8.3 |
| 3,514,589 | 5/1970 | Huber | 240/46.59 |

*Primary Examiner*—Richard L. Moses
*Attorney, Agent, or Firm*—J. C. Evans

[57] ABSTRACT

A concealed vehicle lamp assembly includes an energizable bulb and an exterior lens cover of transparent material aligned with an interior lens to intercept ambient light from the exterior lens and associated with means to reflect a first color through the exterior lens when the bulb is deenergized. The interior lens includes means for directing a second color through the exterior lens when the bulb is energized.

2 Claims, 3 Drawing Figures

DUAL COLOR TAILLAMP

This vehicle relates to vehicle lamp assemblies and more particularly to a lamp assembly for association with body panel portions of a vehicle and including means for concealing the lamp assembly by producing a color corresponding to body panels when the lamp assembly is not illuminated and to produce a second colored light emission differing from that of the body panel when the lamp assembly is illuminated.

One consideration in the styling of motor vehicles is that of orienting vehicle running lights such as taillights and side marker lights with respect to contoured body panels having a painted exterior surface usually of a color which differs from that of the outer lens portion of a taillamp assembly mounted with respect to the body panel. In some cases, aesthetically pleasing configurations require that lamp assemblies have an appearance corresponding to the body panel when the lamp assembly is not self-illuminated.

One example of this approach is to provide a cover for headlamps of a vehicle with the headlamp assembly cover being disposed in overlying relationship to the lamp assembly when the headlamps are off thereby to conceal the headlamp assembly when not needed.

Another approach is to conceal vehicle light assemblies as set forth in U.S. Pat. No. 3,514,589. A tailight or side marker assembly is covered by a decorative panel made up of a colored grid with ambient light reflection therefrom under daytime conditions to cause the grid appearance to correspond to that of adjacent panels so that to the human eye the lamp assembly is effectively concealed. When the unit is self-illuminated, a light source directs light rays through a colored filter to cause colored light to be emitted through apertures in the grid.

An object of the present invention is to improve such concealed vehicle lamp assemblies by the provision of a clear transparent outer lens component and an interior lens component with associated means to provide a dual color output from the lamp assembly in accordance with lamp assembly illumination and wherein the lamp assembly appears concealed with respect to adjacent painted body panel components when the lamp assembly is not illuminated.

Still another object of the present invention is to provide an improved concealed vehicle lamp assembly including flat planar first and second lens components associated with an electrically energizable light source for directing light through one of the lens for producing a first colored light emission indicating illumination of the lamp assembly and further including means associated with the other of the lens components to intercept and reflect exterior light sources when the light assembly is not illuminated to produce a second color emission from the lamp assembly which corresponds to that of adjacent vehicle body panels.

Still another object of the present invention is to provide an improved lamp assembly for association with vehicle body panels including a light transparent exterior lens juxtaposed with respect to planar body portions of the vehicle and an interior lens arranged angularly with respect to the outer lens, the interior lens including a semi-light reflective surface thereon faced toward an interior panel having a painted surface color coordinated to that of the exterior body panel and wherein the interior panel intercepts light rays directed from exteriorly of the lamp assembly through the exterior lens for reflection from the semi-light reflective surface of the interior lens to produce a first apparent color emission from the lamp assembly corresponding to that of the adjacent body panels and wherein an energizable light source is located with respect to the interior lens to direct a light from the lamp assembly when the light source is energized through both the interior lens and the exterior lens so as to produce an apparent light emission from the lamp assembly of a color differing from that of the vehicle body panels.

Further objects and advantages of the present invention will be apparent from the following description, reference being had to the accompanying drawings wherein a preferred embodiment of the present invention is clearly shown.

Figure 1:
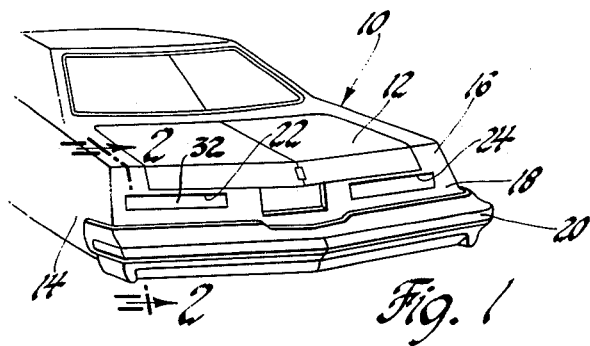
FIG. 1 is a view in perspective of the rear of a vehicle including the lamp assembly of the present invention.
Figure 2:
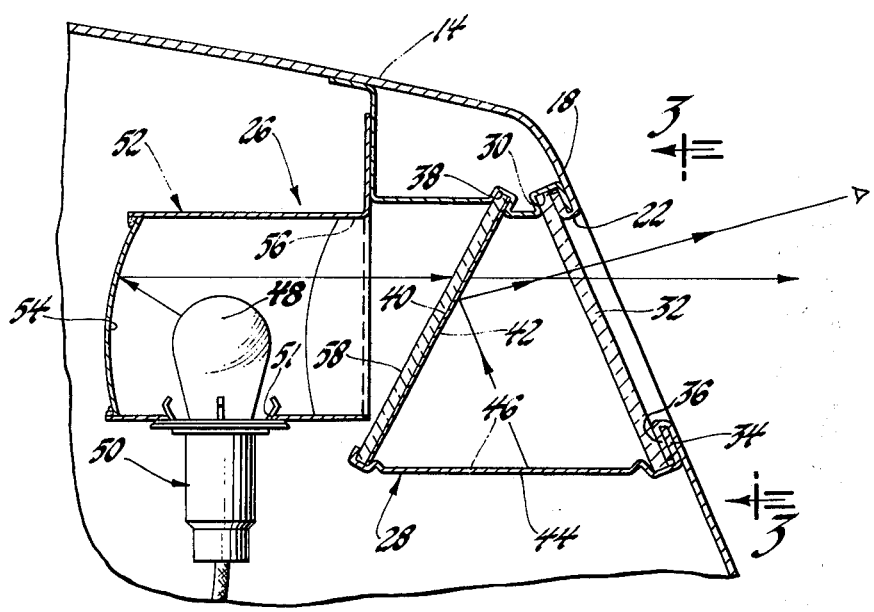
FIG. 2 is an enlarged fragmentary vertical sectional view taken along the line 2—2 of FIG. 1.
Figure 3:
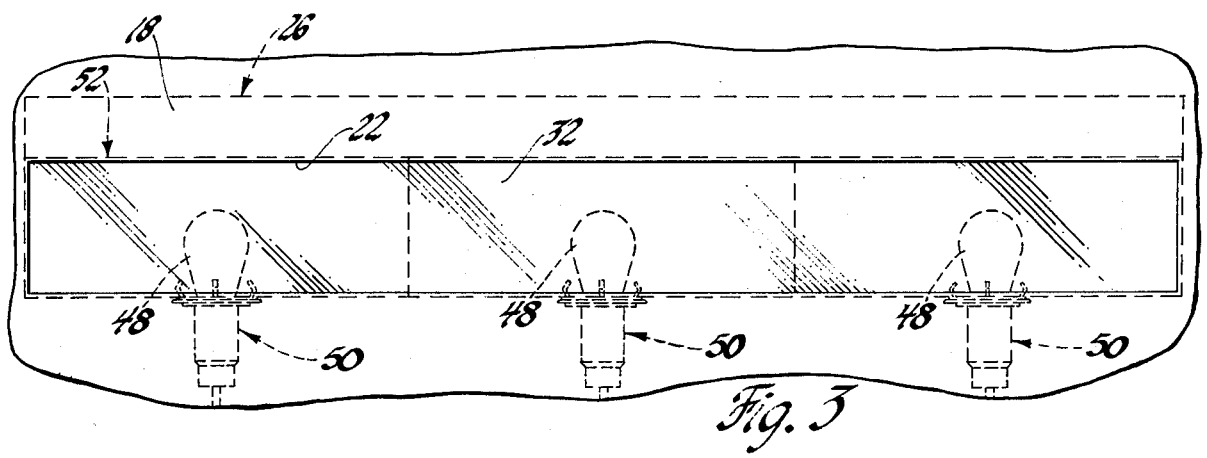
FIG. 3 is a rear elevational view taken along the line 3—3 of FIG. 2 looking in the direction of the arrows.

Referring now to the drawing in FIG. 1, a vehicle 10 is illustrated including a rear trunk lid 12, rear quarter panels 14, 16 and an interposed rear body panel 18 located above a bumper assembly 20.

Rear body panel 18 has spaced apart openings 22, 24 therein of generally rectangular configuration defining the field of view for a taillamp assembly 26 constructed in accordance with the present invention and located in each opening 22, 24.

More particularly, each of the taillamp assemblies 26 includes a forwardly located lens housing 28 including an outboard, annular recessed groove 30 therearound located rearwardly of the sheet metal panel 18. The recess 30 supportingly receives an exterior lens 32, a neutral filter of desired light transmittance material. The exterior lens 32 covers one of the openings 22, 24 and is located substantially coplanar of the rear panel 18, being offset inwardly by an amount representatively shown as including the width of an annular forward flange 34 of the lens housing 28 and a turned over edge 36 of the panel 18 around the opening 22.

The lens housing 28 further includes an inboard located annular recess 38 therein that supportingly receives a rearwardly located, flat planar lens 40 having a forwardly located surface thereon covered by a semi-reflective silvered coating 42 for purposes to be discussed. The lens 40 is angularly inclined with respect to the exterior lens 32 and is located in facing relationship to a bottom panel 44 of the housing 28 which includes an interior surface 46 theron that is painted with a color coordinated to that of the paint color on the exterior panel 18. Such color coordination is advatageous for purposes of concealing the lamp assembly 26 as will be discussed.

The color on the surface 46 can differ from the color of exterior surface 18 if it is desired to have a contrasting relationship between the lamp assembly 26 when it is not illuminated.

The lamp assembly 26 further includes a light source represented by an electrically energizable bulb 48 supported by a socket assembly 50 in an opening 51 of a lamp housing 52 for the assembly 26. The housing 52 includes a parabolic light reflector 54 on one surface of the housing 52. The housing 52 also includes an opening 56 that is aligned with the inboard side 58 of the lens 40 for directing light rays from the bulb 48, when energized, from the parabolic light reflector 54 through the aligned lenses 40, 32.

The interior lens 40 is colored so that when the lamp assembly 26 is illuminated, light directed through lens 40 and through the semi-silvered coating thereon will appear through the transparent colorless lens 32 as a colored light emission corresponding to the tint of the interior lens 40. In the case of taillights the color of the interior lens is red with it being understood that the invention is equally well suited for side markers wherein the colored tint of the interior lens 40 would be amber to give a warning indication.

In accordance with certain principles of the present invention, when the lamp assembly 26 is not illuminated and light from exterior of the vehicle (including ambient daylight) is directed through the transparent exterior lens 32 against the painted surface 46, the assembly is concealed. This is caused by reflection of the panel color at 46 from the semi-silvered outer side coating on the surface 42 back through the exterior lens 32 to produce a color across the viewing field of each of the openings 22, 24 corresponding to that of the panel 18. In tests to date, when the vehicle paint color is a darker tone, and the panel 44 is painted with a like darker tone color, the apparent color reflected from the semi-silvered coating on the surface 42 will produce an apparent color in the clear exterior lens 32 which conforms closely to such darker outer body colors and to serve to make the interior lens 40 appear opaque. When the bulb 48 is energized, the light intensity of rays passed through the interior lens 40 is greater than ambient light directed from the panel 44 and the apparent color seen at the lens 32 conforms to the tone of the interior lens 40 notwithstanding the presence of a semi-silvered outer coating 42. It has been observed that when the horizontal colored panel portion of the lamp lens housing 28 is located above rather than below the lens 40, the color seen when the lamp assembly is not illuminated appears somewhat darker across the viewing field 22, 24.

Thus, the lamp assembly, when not illuminated, includes means for producing an apparent color on the viewing field that will effectively conceal the interior lens from an outside observer, Thus, the rear panel of the vehicle or other panel in which a lamp assembly is located will have an uninterrupted, smooth aesthetically pleasing appearance.

A further advantage of the present invention is that outside light of high intensity entering the lamp assembly will be reflected by the semi-silvered coating 42 before it reaches the parabolic light reflector 54. Hence bright evening horizon sunlight will be attenuated rather than being reflected from the assembly as a glare. More particularly, the semi-silvered lens of the dual lens assembly reflects part of such outside light when the side is near the horizon in a direction away from the field of view.

While the embodiments of the present invention, as herein dislcosed, constitute a preferred form, it is to be understood that other forms might be adopted.

The embodiments of the invention in which an exclusive property or privilege is claimed are defined as follows:

1. A concealed lamp assembly for association with contiguous panel structures of vehicles comprising a housing having an exterior lens of light transparent material, an interior lens of light transparent material having a semi-transparent light reflective metallic coating facing the exterior lens, a colored surface interposed between said interior and exterior lens to receive outside ambient light from said exterior lens, said interior lens being disposed angularly with respect to said exterior lens and said colored surface to reflect an image of said colored surface from said coating through said exterior lens to cause said interior lens to appear opaque under ambient light conditions and to produce a first apparent lamp light color when the lamp is not illuminated, a lamp and reflector for illuminating the interior lens to direct light from said exterior lens when the light is energized to produce a second apparent lamp light color when the lamp is illuminated, said semi-transparent coating further serving to intercept outside ambient light directed at said reflector and redirect such intercepted light when said lamp is deenergized.

2. A concealed lamp assembly for association with contiguous panel structures of vehicles comprising a housing having an exterior lens of light transparent material, an interior lens of colored light transparent material having a semi-transparent light reflective metallic coating facing the exterior lens, a colored surface interposed between said interior and exterior lens to receive outside ambient light from said exterior lens, said interior lens being disposed angularly with respect to said exterior lens and said colored surface to reflect an image of said colored surface from said coating through said exterior lens to cause said interior lens to appear opaque under ambient light conditions and to produce a first apparent lamp light color when the lamp is not illuminated, means for illuminating the interior lens to direct light from said exterior lens when the light is energized to produce a second apparent lamp light color when the lamp is illuminated, said semi-transparent coating further serving to intercept outside ambient light directed at said reflector and redirect such intercepted light when said lamp is deenergized.

* * * * *